United States Patent [19]
Doose

[11] Patent Number: 5,467,743
[45] Date of Patent: Nov. 21, 1995

[54] PET COLLAR

[76] Inventor: Karen A. Doose, 3052 Skyline Dr., Oceanside, Calif. 92056

[21] Appl. No.: 353,632

[22] Filed: Dec. 12, 1994

[51] Int. Cl.⁶ .................................................. A01K 27/00
[52] U.S. Cl. ............................................ 119/864; 119/858
[58] Field of Search .................................. 119/858, 864, 119/856

[56] References Cited

U.S. PATENT DOCUMENTS 2,680,315  6/1954  McHugh et al. ............... 119/858 X
4,321,891  3/1982  Moeller .............................. 119/864
4,426,957  1/1984  Horrigan ........................... 119/864
4,811,695  3/1989  Higgins ............................. 119/864

Primary Examiner—Thomas Price
Attorney, Agent, or Firm—John J. Murphey; Murphy Law Offices

[57] ABSTRACT

A pet collar including first and second flexible belt segments of terminal length adapted to pass around the neck of the pet and form an encircling loop thereabout, an interlocking device attached to the other ends of the belt segments to connect the segments together in end-to-end fashion, a pocket formed in one segment and, a bib connectable to the pocket for depending from the collar.

19 Claims, 3 Drawing Sheets

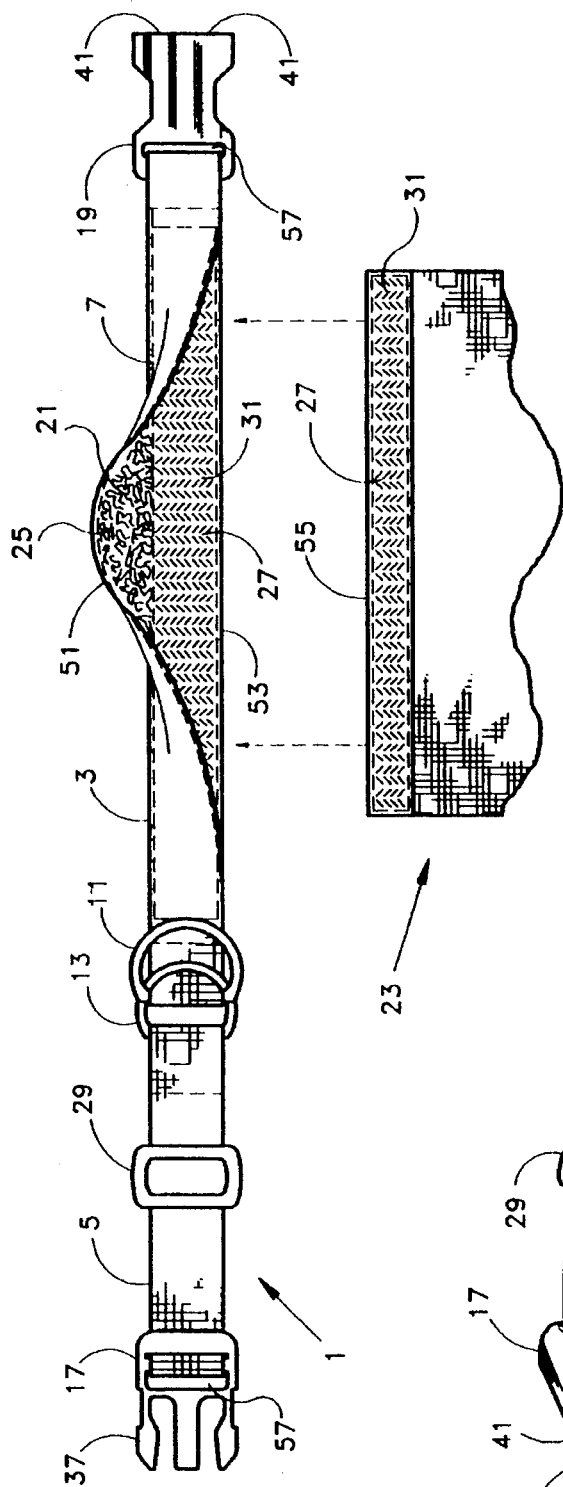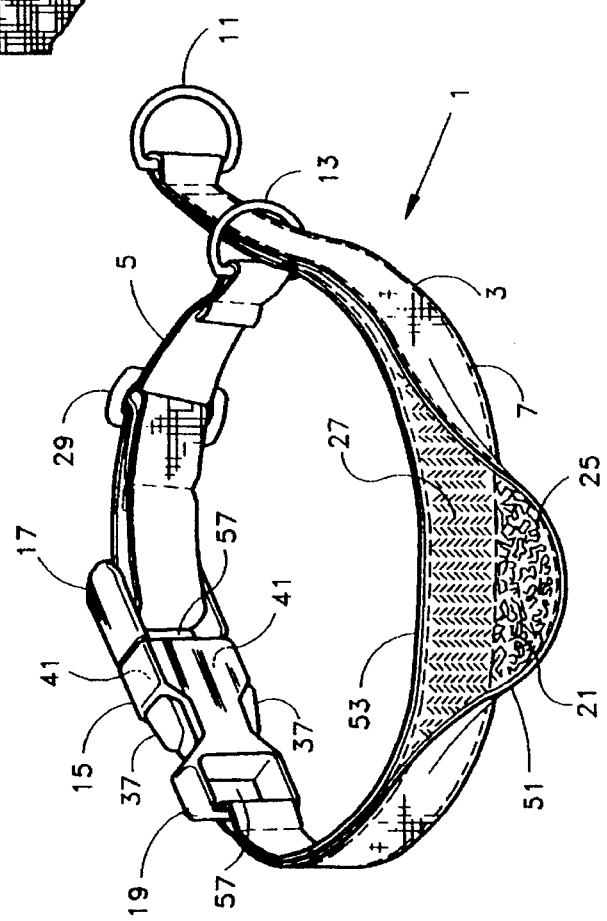

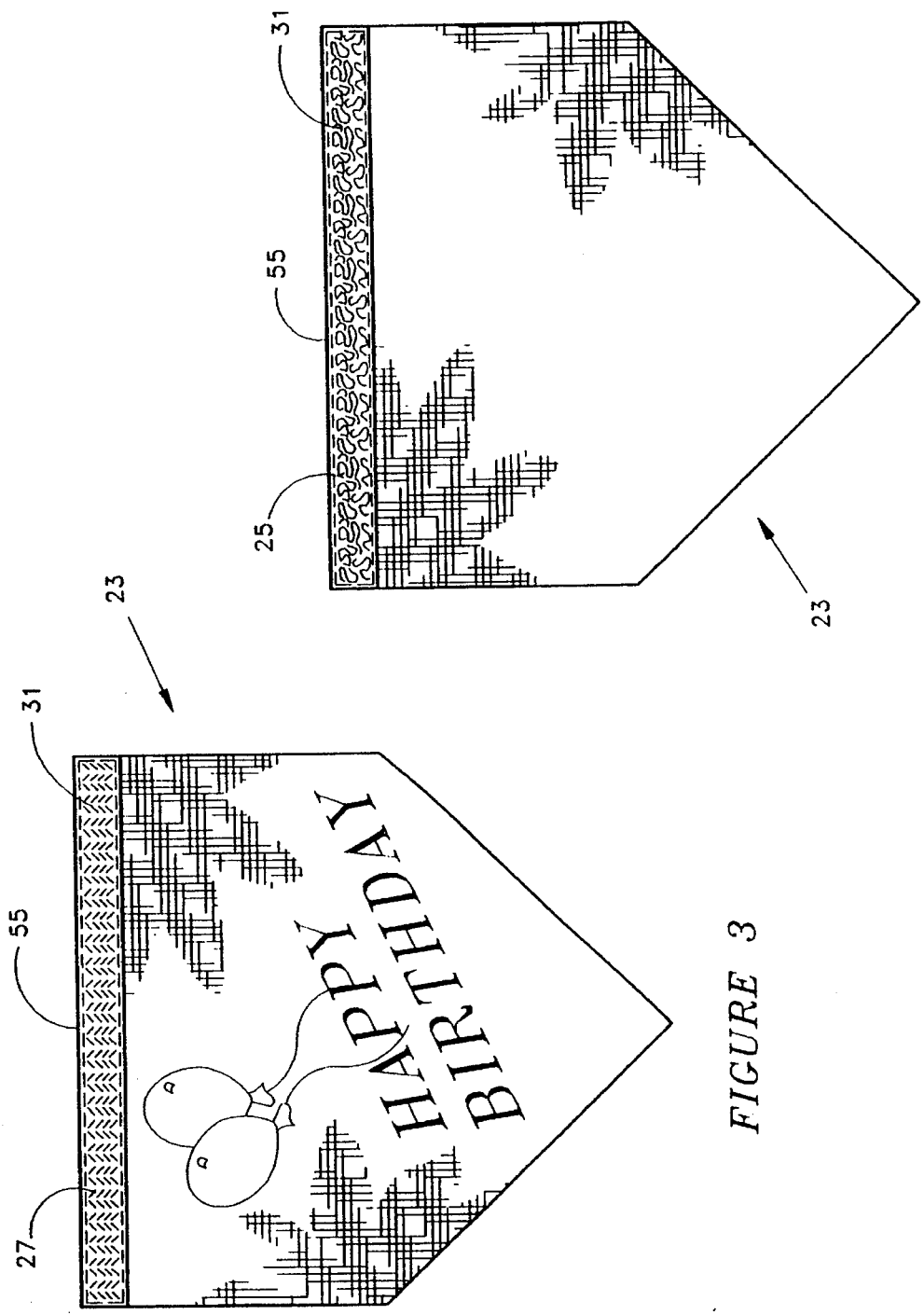

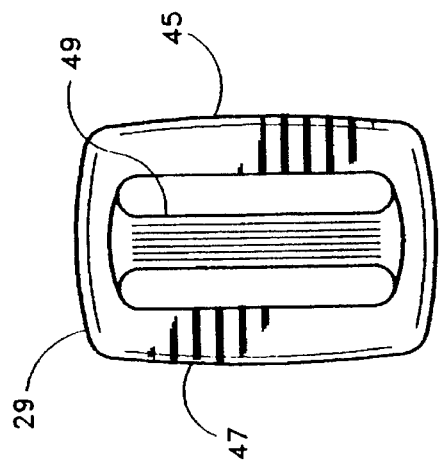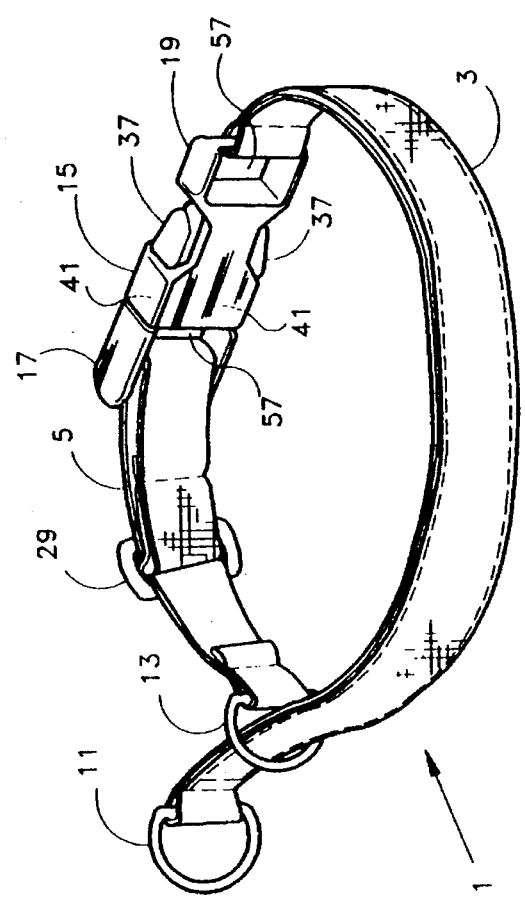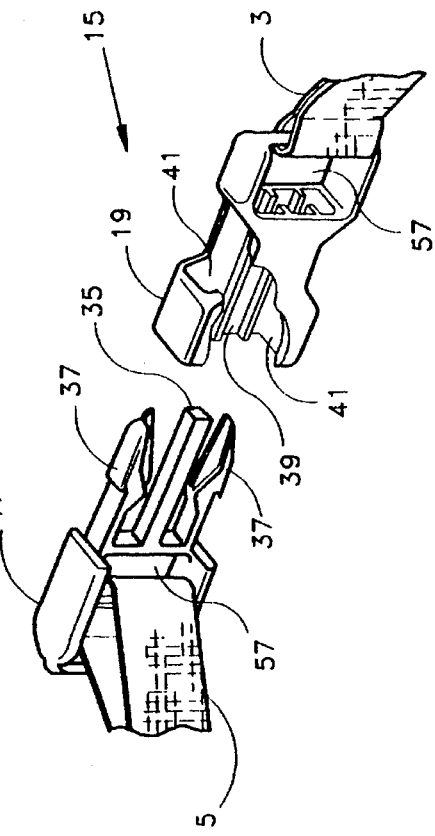

PET COLLAR

BACKGROUND OF THE INVENTION

1. Field of the Invention

This invention pertains to the field of pet collars. More particularly, it pertains to pet collars of adjustable length to accommodate different sized pets and having a pocket formed therein to hold and retain a bib or an article for engagement-disengagement therewith.

DESCRIPTION OF THE PRIOR ART

Pets have been men's best friends for countless generations dating back thousands of years. They provide comfort, friendship and security to some and instruments of livelihood to others.

Unfortunately, a number of pets become lost and stray from time to time. One of the ways of returning the pet to its rightful owner is by identification of domestication. In the modern society, such identification may be had by affixing a symbol of domestication, such as a collar.

The sophistication and creativity dedicated to pet accessories has been evolving at a tremendous pace. Today, one may select a pet collar consisting of a simple belt buckle design to a collar laced with gold and diamonds. Pets and their accessories have become a showing of wealth and/or a showing of one's affection to the pet.

One of the latest pet trends is pet clothing and accessories. Humans design clothing for their beloved pets to keep them warm and/or to decorate their lives with a color and a smile. However, such decorative items are fixed to the particular collar. Thus, if one wishes to change the mood or color of their pet, he or she must repurchase or reconstruct a different collar of different design and colors.

Thus, there remains a need for a functional collar which may be used as a choker collar for manual control of the pet, wherein the user or owner diminishes the circumference of the collar thereby diminishing the circumference of the pet's neck, restricting air supply to its lungs and blood supply to its body. There also remains the need for the collar to serve for identification of domestication, and at the same time, to allow the user and/or owner to decorate his pet with different colors and/or utility attachments.

U.S. Pat. No. 5,322,037 discloses a safety device in a form of a friction clasp which allow for disengagement of the clasp members upon application of predetermined resistance thereto. This allows the collar to unleash and allows the animal to be set free of the collar in the event the collar gets caught on a foreign object or the animal is involved in a struggle.

U.S. Pat. No. D206,525 discloses an ornamental dog collar with a bib.

U.S. Pat. No. 4,321,891 discloses an adjustable animal collar. The collar adjusts to various sizes to accommodate different sized animals.

U.S. Pat. No. 4,407,233 discloses a safety collar for pets. The collar incorporates attachments transversely extending from the length direction of the collar. The attachments may comprise elements of highly reflective material to appraise oncoming traffic of the presence of the animal on individual hook-like members suspended about the collar.

U.S. Pat. No. 4,719,876 discloses a restraint collar which uses Velcro® engagement-disengagement means to snugly place a collar around the animal's neck.

The prior art patents do not disclose a means of engagement-disengagement of articles such as clothing and/or bibs therefrom. Thus, the user is unable to decorate and/or switch functionality of the same collar from time-to-time and from occasion to occasion. The present invention teaches a way of allowing the user to interchange different bibs or items of clothing affixed to the collar upon demand. Further, the present invention allows the bib or clothing to be securely affixed within a pocket formed within the collar. The pocket is lined with Velcro® engagement-disengagement means coupled to corresponding Velcro® lined edge of the bib or clothing item. This allows for secure engagement of the clothing item which is necessary in connection with a fidgety and active animal. Further, the prior art patents do not teach: a collar with an integral, Velcro®-lined pocket used to interchange various bibs and accessory articles with ease and efficiency; attachment means for articles such as bibs or other clothing items thereto; integral Velcro®-lined pocket for receipt and engagement-disengagement means of attaching different accessories and/or bibs wherein such engagement disengagement is achieved by moderate exertion of force and unequaled time efficiency.

In summary, the present invention allows for a variety of additional applications associated with an animal collar. The present invention provides for the collar to serve as a base for various accessories and allows the interchangeability of accessories with ease. The collar of the present invention serves as the base for clothing items and/or bibs without the requirement of changing collars each time the owner wishes to redress his pet. This provides for flexibility and variety which is not found in any other animal collar.

SUMMARY OF THE INVENTION

This invention involves a novel pet collar, namely a pet collar having a pocket therein, where the pocket is lined with engagement-disengagement means for receipt and retention of different accessories such as bibs and/or clothing attached thereto. In its preferred embodiment, the elongated opening is equipped with Velcro® lining on opposite faces of the opening to accept and sandwich the support edge of a corresponding accessory item with Velcro® lining. This configuration provides for engagement-disengagement of a variety of accessory items such as clothing and/or bibs. This provides for novelty and for diversity in animal clothing and appearance.

Thus, the main object of this invention is to provide a collar having means of accepting a variety of accessory items such as bibs for the animals. It is further an object of this invention to: provide simple and functional engagement-disengagement means within the collar to quickly and easily interchange various accessories therein; provide all the functionality ordinarily associated with a pet collar, namely a collar which is a choker collar and a collar which is adjustable in length to accommodate different size pets; provide a pet with a safety device such as a highly reflective bib or material fastened to the collar to be worn by the pet in the nighttime and to remove such device on demand; provide detachable identification means; and, to provide for secure attachment of different accessories to the collar which are readily and easily removable and detachable therefrom.

These and other objects of the invention will become more apparent when reading the description of the preferred embodiment when taken together with the drawings appended hereto. The scope of the protection sought by the inventor may be gleaned from a fair reading of the claims

DESCRIPTION OF THE DRAWINGS

FIG. 1 is a perspective view of the pet collar with the pocket in an open position for receipt of the bib;

FIG. 2 is a detailed view of the pocket, illustrating the Velcro® lining therein for receipt and retainment of the bib;

FIG. 3 is a top plan view of the bib, illustrating the front side of the bib and the Velcro® lining on the support edge thereof for mutual engagement with the Velcro® lining within the pocket;

FIG. 4 is a top plan view of the bib, illustrating the back side of the bib and the Velcro® lining on the support edge thereof for mutual engagement with the Velcro® lining within the pocket;

FIG. 5 is a perspective view of the pet collar with its pocket in a closed position;

FIG. 6 is a top plan view of the tripodal buckle; and,

FIG. 7 is a prospective view of the clasp 15.

DESCRIPTION OF THE PREFERRED EMBODIMENT

Referring to the drawings wherein like elements are identified with like numerals throughout the eight figures, the apparatus of this invention is shown in FIG. 1 to comprise a flexible pet collar 1 with means to engage and disengage a bib 23.

Collar 1 employs two interconnected belt segments 3 and 5. Belt segments 3 and 5 are generally pliable and flexible to accommodate comfort for the pet and to accommodate hand comfort to the person controlling the pet by its collar. In the preferred embodiment belt segments 3 and 5 are constructed of synthetic fibers. However, belt segments may be constructed of cotton, poly-cotton, or any other pliable material capable of sustaining moderate transverse force associated with controlling a pet by its collar.

Each belt segment 3 and 5 has two terminal ends. One end of each segment terminates in a ring such as "D" rings 11 and 13. In other embodiments "O" rings may also be used. The "D" ring configuration is illustrated in FIGS. 2 and 5. The preferred belt attachment to the ring is a loop about the straight portion of "D" ring 11 or 13. "D" rings are preferred because they exhibit the straight portion therein, thus preventing kinking and premature wear of belt segments 3 and 5 attached thereto.

In the preferred embodiment, "D" rings 11 and 13 are metal. Metal composition is preferred for economy, and tolerance to a dynamic range of force and temperature variation. In other embodiments of the invention, "D" rings may be constructed of any other rigid materials selected from the group consisting of metal, plastic, wood, ceramic, glass, polyurethane and rigid fiber.

To provide for a choker function, "D" ring 11 and "D" ring 13 are of different sizes. "D" ring 11 is generally of a larger circumference than "D" ring 13. By passing a terminal end of belt segment 3 through ring 13 and attaching ring 11 to the terminal end of belt segment 3, belt segment 3 enjoys a slidable bidirectional passage within the smaller ring 13. Segment 3 passage is limited by the larger ring 11 meeting the smaller ring 13 in one direction and by a clasp 15 and/or the pet's neck in the other direction. By pulling on ring 11, the user decreases the circumference of the collar. This provides for a choker collar function desirable for the control of the pet.

For ease of attaching and detaching collar 1 onto the pet, collar 1 incorporates a clasp 15 illustrated in FIG. 7. Clasp 15 is preferably constructed of a plastic material. Plastic is desirable for its strength, economy, spring like attributes and light weight. In other embodiments of the invention, clasp 15 may be constructed of alternate rigid materials capable of mutual interaction to engage and disengage to and from its respective clasp members. Clasp 15 has a male clasp member 17 and a female clasp member 19 for mutual interengagement therewith. In the preferred embodiment, clasp members 17 and 19 are attached to respective terminal ends of belt segments 5 and 3, wherein the belts respectively loop about a clasp retainer cavity 57 integral to each clasp member 17 and 19. There is no preference of attachment of male clasp member 17 or female clasp member 19 to a specific belt segment 3 or 5. The positioning of clasp members 17 and 19 is interchangeable. Male clasp member 17 has a guide 35 positioned in the center of two biased anchors 37. Female clasp member has a corresponding guide cavity 39, for receipt of guide 35, and two corresponding anchor cavities 41, for receipt of two biased anchors 37. Upon insertion of male member 17 into female member 19, anchors 37 snap into anchor cavities 41 thereby retaining collar 1 on the neck of the pet.

Detachment of collar 1 from pet's neck is accomplished by mutual application of pressure to anchors 37, thus biasing anchors 37 out of anchor cavities 41. Upon release of anchors 37 from anchor cavities 41, male clasp member 17 is laterally disengaged from its respective female clasp member 19 and thereby disengages collar 1 from the neck of the pet.

In other embodiments of the invention, clasp 15 may be substituted by a buckle. The belt segment opposite the buckle employs a series of cavities for receipt of a buckle tongue therethrough. Virtually any and all attachment and detachment means ranging from a knot to a sophisticated clasp would perform the functionality of joining two opposite ends to enclose a circumference calculated to embody the pet's neck. The preferred embodiment employs clasp member 15 for its versatility, dependability and ease of engagement and disengagement to and from the pet's neck.

In the preferred embodiment, collar 1 employs a continuous length adjustment, allowing collar 1 to adjust to a variety of pet sizes. To achieve the desired circumference, a slidable, tripodal clip means 29 is employed as illustrated in FIG. 6. Clip 29 includes a left pole 47, a right pole 45 and a middle pole 49 arranged in a parallel fashion to provide a rigid parameter and securing means. To achieve variable circumference of collar 1, terminal end of belt segment 5 opposite "D" ring 13 is attached to middle pole 49. Its opposite terminal end is looped under left pole 47, over middle pole 49 and under right pole 45. The result is a two-ply belt segment which contracts and expands its length dimension by moving or sliding the clip 29 to and from ring 13. In this configuration, clasp member 17 or 19 is movable suspended between the terminal ends of the belt segment 5. In this configuration, belt segment 5 is expandable from one to two units of length as required by the pet size. The unit of length is user definable to accommodate his or her requirements.

As shown in FIGS. 1 and 2, the first belt segment 3 incorporates a two-ply belt arrangement, 51 and 53, having a common integral edge 7 spanning longitudinally from terminal end to terminal end of segment 3. Edge 7 uniformly divides and defines the belt segment 3 into a two ply arrangement, wherein each first and second ply, 51 and 53 respectively, share and fold about the edge 7 meeting face to face.

An elongated pocket 21 is defined by folding first and second belt plies, 51 and 53, along edge 7 and terminating belt segment 3 at its terminal ends about "D" bracket 11 at one end and about clasp 15 at the other end. Elongated pocket 21 is preferred for its added surface area which is conducive in holding and communicating with the attached article. However, in other embodiments of the invention, pocket 21 may comprise non-elongated geometry, including square and elliptic cross-sections.

During normal, operative use of collar 1 pocket 21 is directed downward. The downward arrangement provides a work area to the user to engage and disengage a bib 23 or like articles to and from collar 1. Further, the downward orientation of pocket 21 allows the gravitational force to organize and suspend bib 23 from the pet.

In the preferred embodiment, the engagement/disengagement means to attach and remove bib 23 is a Velcro® lining attached along a support edge 55 of bib 23. Velcro® is a trademark. More specific details of the Velcro® device may be had from U.S. Pat. No. 2,717,437, entitled VELVET TYPE FABRIC AND METHOD OF PRODUCING SAME, issued Sep. 13, 1955 to George de Mestral and U.S. Pat. No. 3,114,951 entitled DEVICE FOR JOINING TWO FLEXIBLE ELEMENTS issued Dec. 24, 1963 to George de Mestral. The Velcro® material is available in strips of tape or material, hereinafter referred to as "Velcro®" receptacles 27 and "Velcro®" receivers 25, a product of American Velcro, Inc.

Belt ply 51 is lined with a strip of Velcro® receivers 25 substantially from end to end of said pocket 21. Correspondingly, belt ply 53 is lined with a strip of Velcro® receptacles 27 substantially from end to end of said pocket 21. This arrangement allows pocket 21 to remain in a closed position when no bib or other articles are attached within pocket 21. In the closed position, collar 1 is employed in its traditional way.

To suspend bib 23, illustrated in FIGS. 3 and 4, or other articles from pocket 21, a support edge 55 of bib 23 is correspondingly lined with a strip of Velcro® receptacles 27 on one side thereof and with a strip of Velcro® receivers 25 on the opposite side thereof. To retain bib 23 within pocket 21, pocket 21 is opened and support edge 55, lined with Velcro® receptacle lining 27 on one side and with Velcro® receiver lining 25 on the opposite side, is inserted thereinto. The bib 23 support edge is sandwiched between corresponding pocket faces of plies 51 and 53 which are lined with corresponding Velcro® receptacle and receiver lining for retaining bib 23.

This arrangement allows for secure attachment of bib 23 and/or any article to be suspended from pocket 21. The benefit of dual Velcro® grip is a positive retention of articles suspended from collar 1 about pocket 21. In a single Velcro® receiver/receptacle lining configuration, if an article is snagged with a sufficient force, the article is likely to detach and lose its communication. However, in a double Velcro® receiver/receptacle lining configuration, as disclosed above, the force required to snag an attached article is significantly greater, yet a calculated removal of the article remains very simple.

The operation of attaching and detaching bib 23 or other articles to and from pocket 21 is very time-efficient because the Velcro® engagement and disengagement means provides for assured retention, ease of operation and low time consumption to achieve the desired result. Further, a number of interchangeable bibs and/or articles can be readily adapted for use with the present invention. Collar 1 provides a base for suspension of a number of decorative or functional items including but not limited to bibs, clothing and identification tags. For example, a dog or a cat owner would likely attach a white or a reflective article at night time while the animal is outside. This would provide oncoming traffic with additional time or warning necessary to avoid harm to the animal.

In other embodiments of the invention, the engagement-disengagement means 31 includes, but is not limited to snaps, buttons, hooks, zippers, adhesives, friction held deformable track guides commonly found in Zip Lock brand sandwich bags.

While this invention has been described with references to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A pet collar comprising:
   a) first and second flexible belt segments of terminal length adapted to pass around the neck of the pet and form an encircling loop thereabout;
   b) an interlocking clasp attached respectively to one end of each said segment to connect said segments together in end-to-end fashion;
   c) a pocket formed in one said segment; and,
   d) a bib removeably connected to said pocket for depending from said collar.

2. The collar of claim 1 having a pair of inflexible rings one attached to the other end of each said belt segment wherein said rings are of different size such that said first ring is smaller than said second ring and wherein said second belt segment is passed through said first ring such that said second larger ring may be used as a choker anchor.

3. The collar of claim 2, wherein said rings are constructed of a material selected from group consisting of metal, plastic, wood, ceramic, glass, polyurethane and rigid fiber.

4. The pet collar of claim 2 wherein said rings are formed in a shape of a "D".

5. The pet collar of claim 1 wherein said clasp having clasp members comprising a male member and a female member for interlocking engagement.

6. The pet collar of claim 1 further including a buckle.

7. The pet collar of claim 1 wherein said interlocking clasp is formed of male and female interlocking clasp members one each attached to each said belt segment.

8. The pet collar of claim 1 wherein said pocket is elongated.

9. The pet collar of claim 1 where said pocket is directed downward when said pet collar is operatively positioned on the pet.

10. The pet collar of claim 1 wherein said pocket is lined on at least one side with engagement/disengagement means to hold said bib in said pocket.

11. The pet collar of claim 10 wherein said engagement/disengagement means includes a strip of Velcro®.

12. The pet collar of claim 10 wherein said engagement/disengagement means includes two strips of Velcro® set opposite to each other.

13. The pet collar of claim 1 where said pocket is lined on both sides with engagement/disengagement means to hold said bib in said pocket.

14. The pet collar of claim 1 wherein said bib includes a support edge containing engagement/disengagement means on at least one side of said edge to hold said bib in said pocket on at least one side thereof.

15. The pet collar of claim 14 wherein said engagement/disengagement means is located on both sides of said bib edge to hold said bib in said pocket.

16. A pet collar comprising:
   a) first and second flexible belt segments of terminal length adapted to pass around the neck of the pet and form an encircling loop therabout;
   b) a pair of inflexible rings attached to one end of each said segment wherein said rings are formed in the shape of a "D" and are of different size such that said first ring is smaller than said second ring and wherein said second belt segment is passed through said first ring such that said second larger ring may be used as a choker anchor;
   c) an interlocking clasp, attached to the other ends of said belt segments to connect said segments together in end-to-end fashion, having a mutually interlocking male clasp member and a female clasp member, one each attached to each said belt segment;
   d) an elongated pocket formed in one of said segments wherein said pocket is directed downward when said collar is operatively positioned on said pet and is lined on at least one side with first engagement/disengagement means to hold a bib in said pocket; and,
   e) said bib having a support edge removeable connected to said pocket for depending from said collar wherein said support edge includes at least one second engagement/disengagement means to hold said bib in said pocket on at least one side thereof.

17. The pet collar of claim 16 having adjustable length means for adjusting said belt segment to accommodate different size pets.

18. The pet collar of claim 17 wherein said expansion means includes a slidable tripodal clip adjustably fixing the length of said belt segment.

19. The pet collar of claim 16 wherein said disengageable engagement means is on opposite sides of said bib support edge to hold said bib in said pocket.

* * * * *